(12) United States Patent
Sakura

(10) Patent No.: US 8,879,089 B2
(45) Date of Patent: Nov. 4, 2014

(54) IMAGE OUTPUT APPARATUS, METHOD FOR OUTPUTTING IMAGE, AND STORAGE MEDIUM

(71) Applicant: Canon Kabushiki Kaisha, Tokyo (JP)

(72) Inventor: Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 13/764,508

(22) Filed: Feb. 11, 2013

(65) Prior Publication Data
US 2013/0208300 A1   Aug. 15, 2013

(30) Foreign Application Priority Data
Feb. 14, 2012   (JP) .................................. 2012-029709

(51) Int. Cl.
G06K 15/00 (2006.01)
G06F 3/12 (2006.01)
G06F 15/00 (2006.01)
G06K 1/00 (2006.01)
H04N 1/40 (2006.01)

(52) U.S. Cl.
CPC .......... *G06K 15/4045* (2013.01); *G06F 3/1288* (2013.01); *G06F 3/1285* (2013.01); *G06F 3/1286* (2013.01); *G06F 3/1204* (2013.01); *G06F 3/1226* (2013.01); *G06F 3/1232* (2013.01); *G06F 3/1238* (2013.01); *G06F 3/1292* (2013.01); *G06F 15/002* (2013.01); *G06K 15/4095* (2013.01)
USPC ......... 358/1.14; 358/1.18; 358/1.9; 358/3.28; 358/1.13

(58) Field of Classification Search
None
See application file for complete search history.

(56) References Cited

U.S. PATENT DOCUMENTS

| | | | |
|---|---|---|---|
| 7,609,417 B2 * | 10/2009 | Hashimoto ................... | 358/400 |
| 8,456,679 B2 * | 6/2013 | Farrell .......................... | 358/1.15 |
| 8,526,041 B2 * | 9/2013 | Suzuki .......................... | 358/1.15 |
| 2002/0181010 A1 * | 12/2002 | Pineau .......................... | 358/1.15 |
| 2008/0137138 A1 * | 6/2008 | Matoba ......................... | 358/1.15 |
| 2008/0313744 A1 * | 12/2008 | Nakajima et al. ............... | 726/28 |
| 2011/0085195 A1 * | 4/2011 | Tsuchiya ...................... | 358/1.14 |
| 2013/0169996 A1 * | 7/2013 | McLeod et al. .............. | 358/3.28 |
| 2013/0314734 A1 * | 11/2013 | Suzuki ......................... | 358/1.13 |

FOREIGN PATENT DOCUMENTS

JP   2003-169187 A   6/2003

* cited by examiner

*Primary Examiner* — Satwant Singh
(74) *Attorney, Agent, or Firm* — Canon USA Inc. IP Division

(57) ABSTRACT

An image output apparatus includes a display unit configured to display on an operation unit a screen including an object indicating that printing is to be performed from a portable terminal apparatus, a generation unit configured to, when the object included in the screen is selected, generate an information code indicating address information and function information of the image output apparatus or an information code indicating the address information and status information of the image output apparatus, a reception unit configured to receive a print job from the portable terminal apparatus having read the information code, and an output unit configured to output the print job received by the reception unit, wherein the display unit displays the information code on the screen.

12 Claims, 17 Drawing Sheets

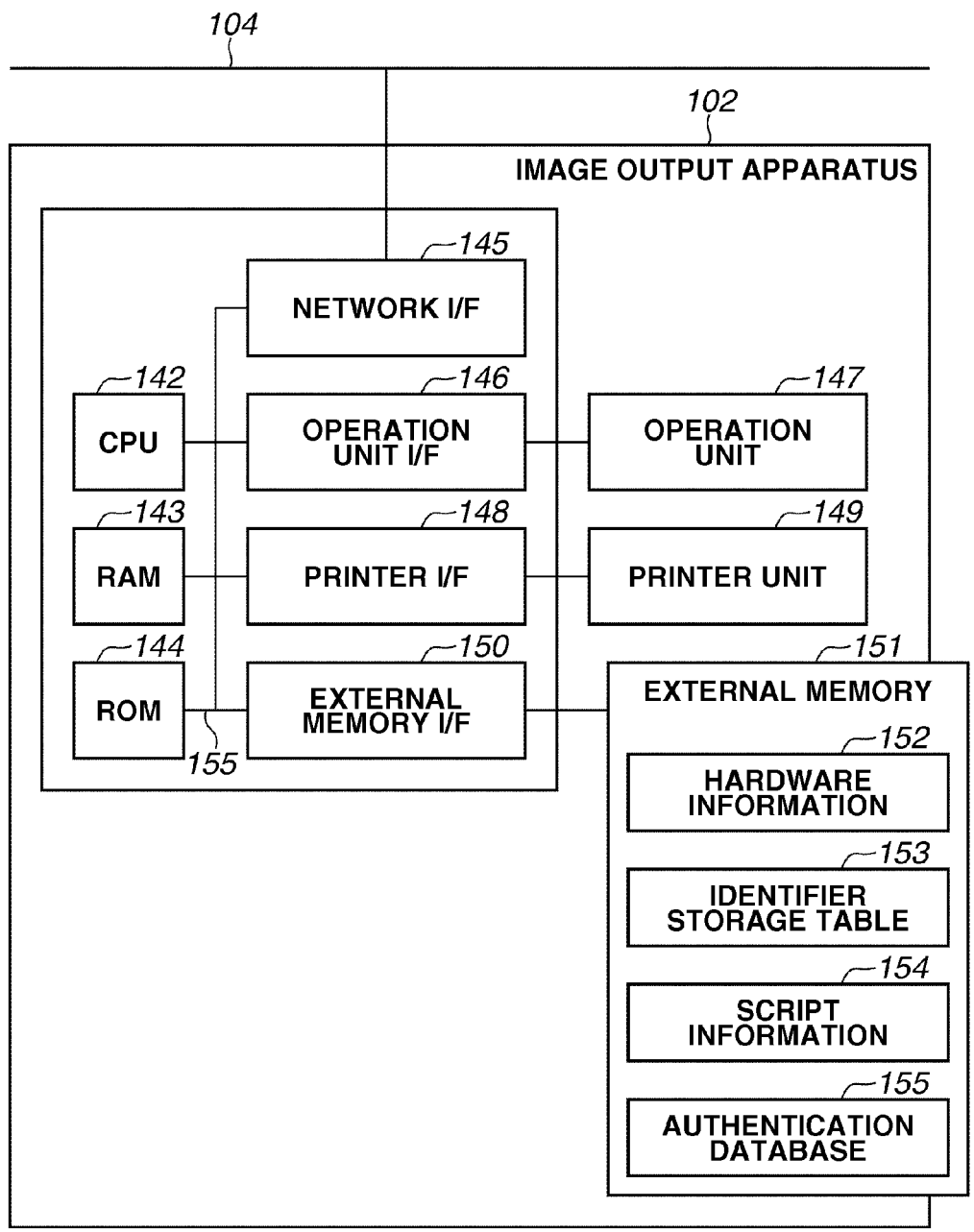

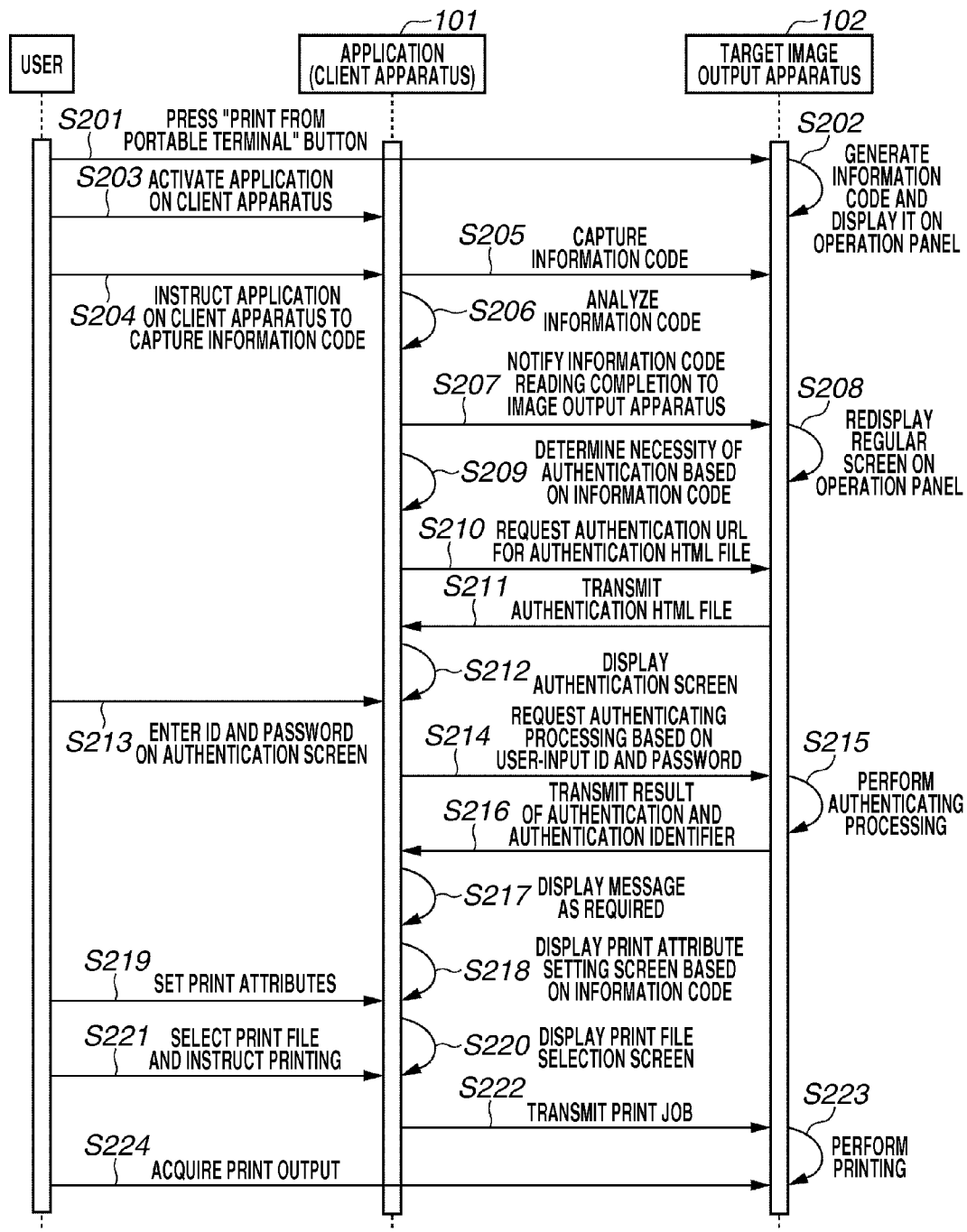

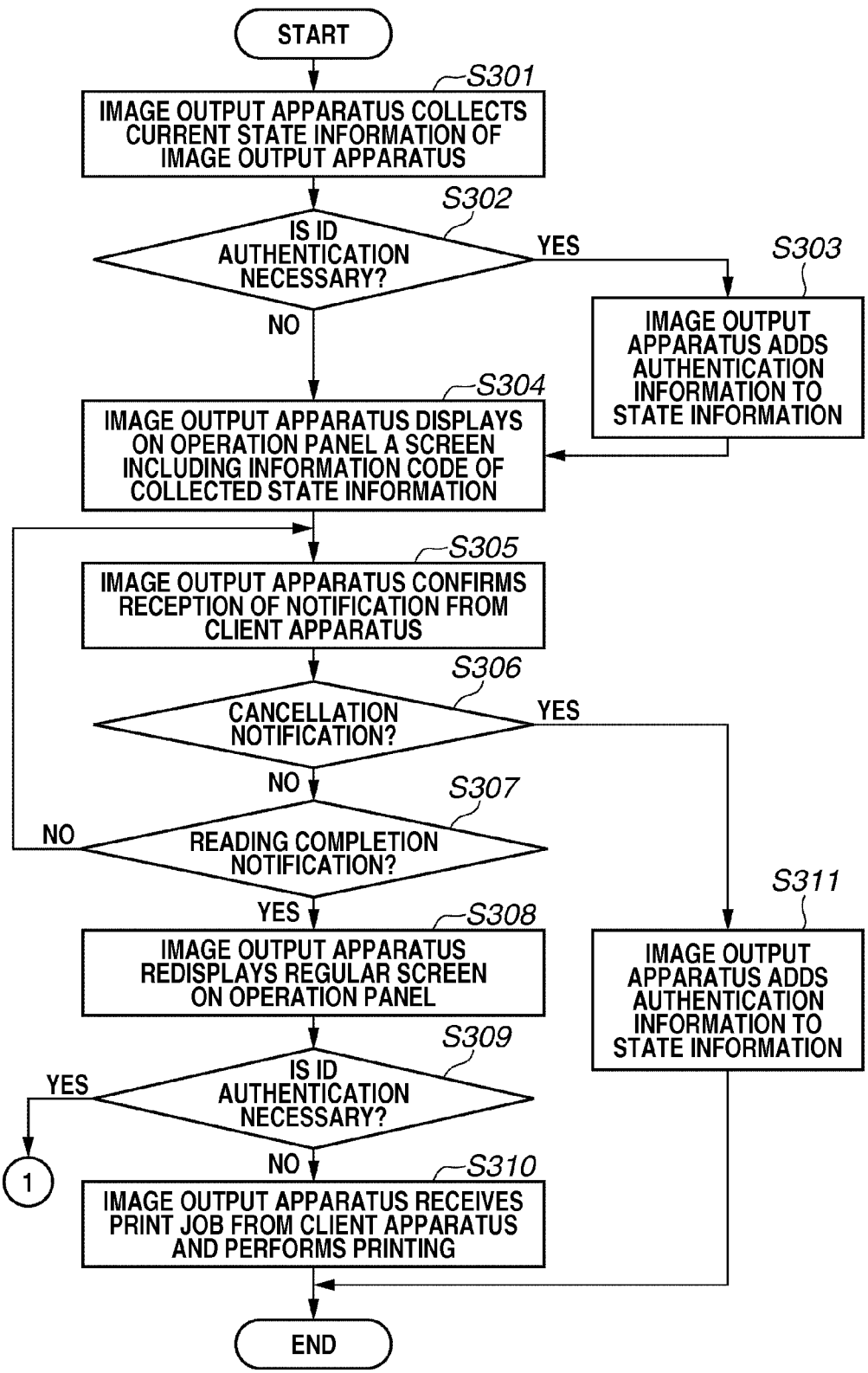

FIG.5A

```
501 DestinationAddress: 192.168.1.99;
502 DeviceCapabilities: Color, Duplex, Staple:UL UR R L, Punch, Booklet;
503 DeviceStatus: PaperEmpty:A4;
504 Auth: No;
```

FIG.5B

```
511 DestinationAddress: 192.168.1.99;
512 DeviceCapabilities: Color, Duplex, Staple:UL UR R L, Punch, Booklet;
513 DeviceStatus: PaperEmpty:A4;
514 Auth: Yes;
515 AuthURL: http://192.168.1.99/authentication/;
```

FIG.6

```
601  <html>
602  <title>Authentication</title>
603  <body>
604  <center>ID AUTHENTICATION</center>
605  <form action="/bin/auth.exe"method="post">
606  <p>ID: <input type="text" name="id"> </p>
607  <p>PASSWORD: <input type="password" name="password"> </p>
608  <p> <input type="submit" value="AUTHENTICATION"> </p>
609  <p> <input type="submit" value="CANCEL"> </p>
610  </form>
611  </body></html>
```

JOB TICKET ~801

PRINT DATA ~802

811 <uuid> 69536026-acf4-4c7-8879-0a042c309ff6 </uuid>

812 <copies> 1 </copies>

812 <color> color </color>

813 <duplex> off </duplex>

814 <staple> off </staple>

815 <punch> off </punch>

816 <booklet> off </booklet>

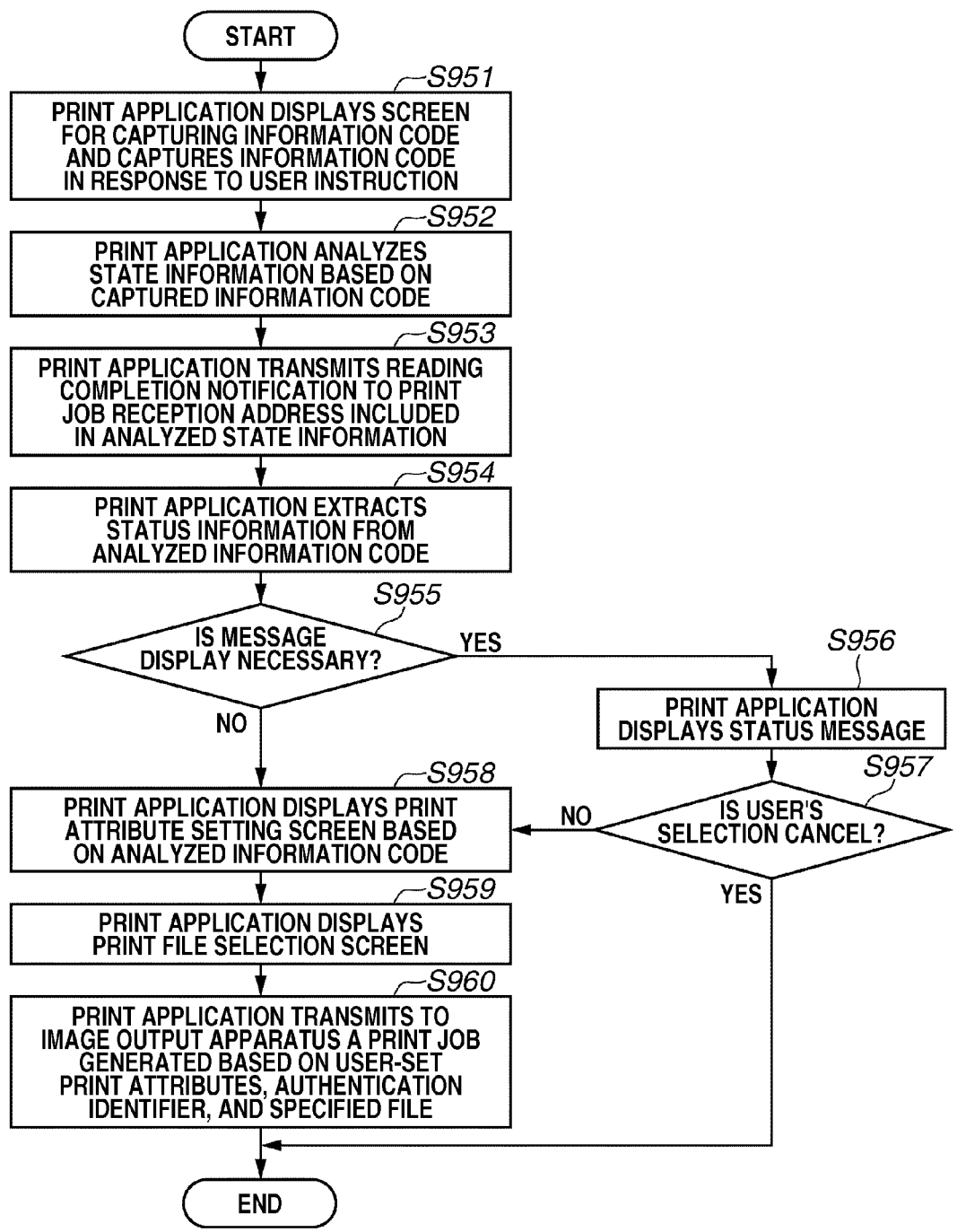

IMAGE OUTPUT APPARATUS, METHOD FOR OUTPUTTING IMAGE, AND STORAGE MEDIUM

BACKGROUND OF THE INVENTION

1. Field of the Invention

Aspects of the present invention generally relate to an image output apparatus, a method for outputting an image, and a storage medium.

2. Description of the Related Art

Portable terminals have a feature of enhanced security specifications. As an example of this feature, an application on a portable terminal cannot freely access the resource of the portable terminal. To maintain such a feature, a portable terminal has such a structure that driver software of each vendor cannot be installed therein. Therefore, with some early portable terminals, for example, it was not possible to install a printer driver and output a document to a printer from each application, which has been easily achieved by desktop terminals.

To solve this limitation, at present, two methods for outputting a document from a portable terminal to a printer are mainly employed.

One method is that an operating system (hereinafter referred to as OS) of the portable terminal offers print functions. Specifically, the OS of the portable terminal offers a library for printing as a framework or an Application Programming Interface (API). When an application calls the API, the API prints a document or image data of the application itself. In this case, since the OS of the portable terminal specifies a specific print protocol, the printer needs to conform to the print protocol. The print protocol includes a printer search protocol and a protocol for printing print data having a specific format, specified by the OS of the portable terminal.

The other method is that the application itself transmits print data directly to the printer. In this case, the application grasps functions of the printer in advance and transmits such print data that can be interpreted by the printer.

With either of the two methods, the user performs printing with the following procedures unlike conventional printing on desktop terminals. First, the user selects the print menu from the application on the portable terminal. Then, the user performs printer search to search for a printer connected on the network. Based on the result of printer search, the user selects a printer to be used for printing. Finally, the user sets print attributes and instructs execution of printing.

However, there has been the following problem in such printing methods and procedures. When performing printing, the user needs to select a printer. When there is a plurality of printers of the same model, selecting a suitable printer is difficult because a list of the result of printer search displays only product names of printers. Depending on the search protocol for printer search, printer search beyond a router is not possible. Therefore, even a physically close printer may not be searched for.

A technique for identifying a printer usable for printing is discussed in Japanese Patent Application Laid-Open No. 2003-169187. With the technique discussed in Japanese Patent Application Laid-Open No. 2003-169187, a data transmission destination device displays on a printer's operation panel an information code indicating a device address. Then, by using a built-in camera, a portable terminal reads the information code displayed by the data transmission destination device. The portable terminal extracts the address of the data transmission destination device based on the read information code and then transmits data to that address.

However, the method for reading the information code by using the camera of the portable terminal to identify a transmission destination printer has the following problems.

When the data transmission destination is a printer, print functions are generally different for each product. In the conventional method, on the other hand, since a data transmission source reads only a data transmission destination address, the user may be unable to perform desired printing.

SUMMARY OF THE INVENTION

An aspect of the present invention relates to a method for enabling a user to easily identify an image output apparatus subjected to image output and to perform desired printing.

According to an aspect of the present invention, an image output apparatus includes a display unit configured to display on an operation unit a screen including an object indicating that printing is to be performed from a portable terminal apparatus, a generation unit configured to, when the object included in the screen is selected, generate an information code indicating address information and function information of the image output apparatus or an information code indicating the address information and status information of the image output apparatus, a reception unit configured to receive a print job from the portable terminal apparatus having read the information code, and an output unit configured to output the print job received by the reception unit, wherein the display unit displays the information code on the screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1C illustrates an example hardware configuration of an image output apparatus.

FIG. 2 is a sequence chart illustrating an example of image output processing performed by the printing system.

FIG. 3A is a flowchart illustrating an example of image output processing performed by an image output apparatus according to the first exemplary embodiment.

FIG. 5A illustrates example data in status information.

FIG. 5B illustrates example data in the status information.

FIG. 6 illustrates an example of an authentication HTML file.

FIG. 10B is a flowchart illustrating an example of image output processing performed by the image output apparatus according to the second exemplary embodiment.

DESCRIPTION OF THE EMBODIMENTS

Various exemplary embodiments, features, and aspects of the invention will be described in detail below with reference to the drawings.

Figure 1A:
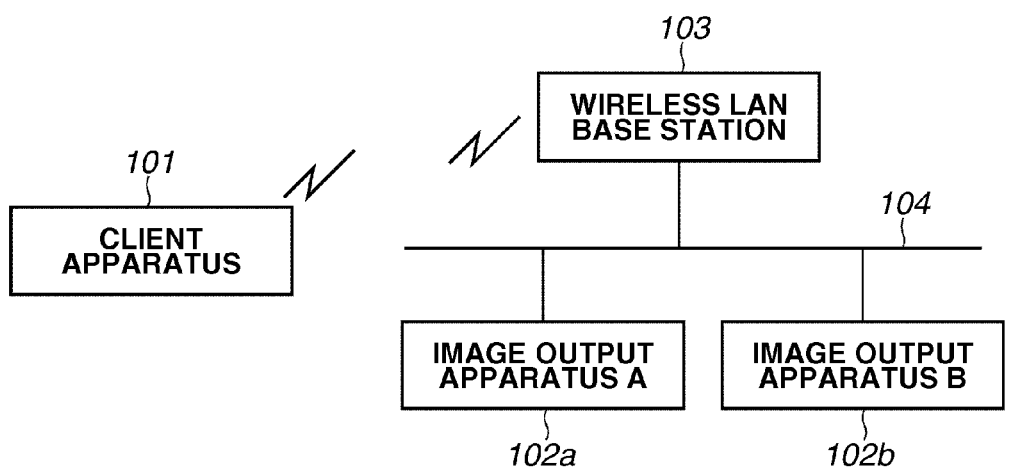
FIG. 1A illustrates an example configuration of a printing system according to a first exemplary embodiment.

FIG. 1A illustrates an example configuration of a printing system according to a first exemplary embodiment of the present invention. The printing system according to the present exemplary embodiment includes a client apparatus 101, which is a portable terminal operable by a user, and image output apparatuses 102, which can receive and output a print job. These apparatuses are connected via a network 104, such as the Ethernet, and a wireless LAN base station 103 for wirelessly connecting the network. The image output apparatuses 102 are capable of receiving and printing a print job generated by the client apparatus 101 and received via the network 104.

Figure 1B:
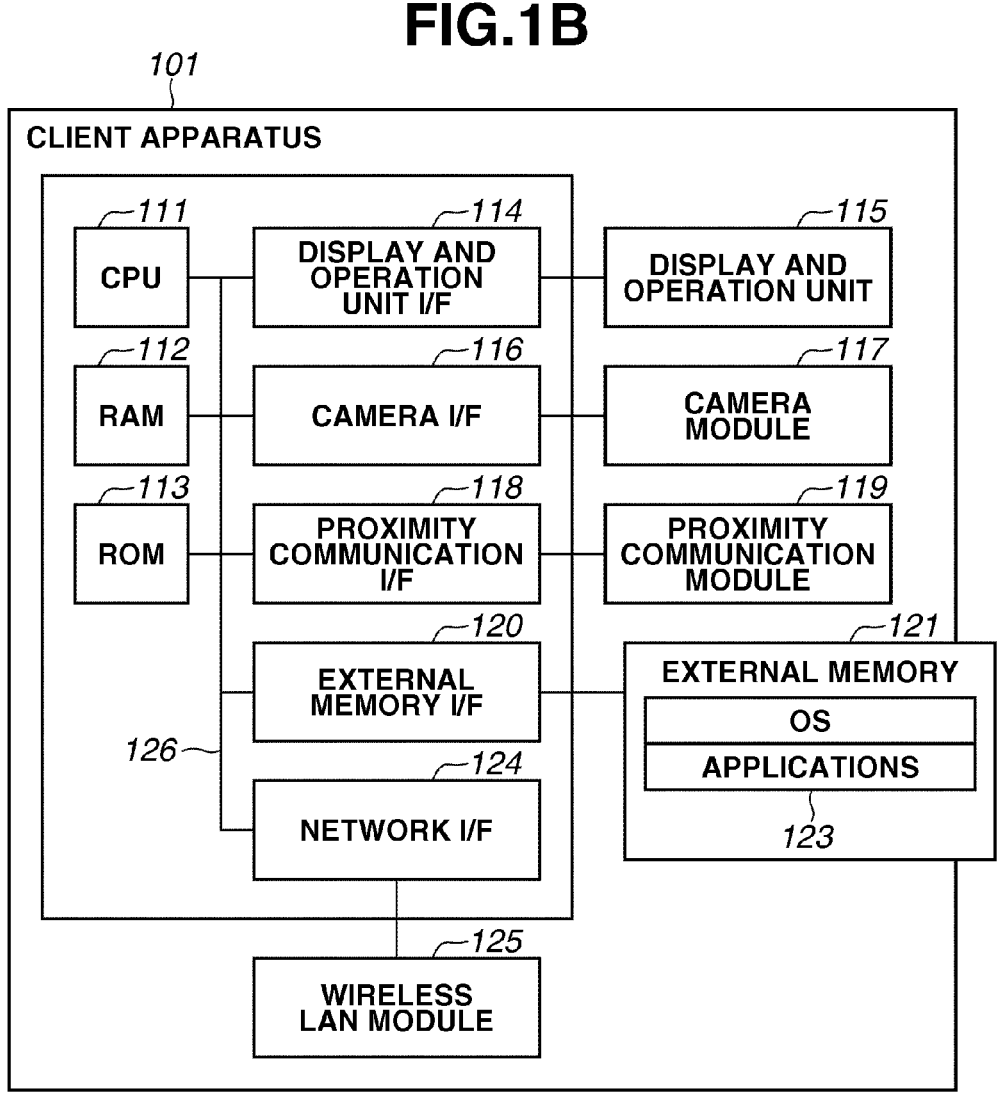
FIG. 1B illustrates an example hardware configuration of a client apparatus.

FIG. 1B illustrates an example hardware configuration of the client apparatus 101 illustrated in FIG. 1A. In the client apparatus 101, a central processing unit (CPU) 111 totally controls each device connected to a system bus 126 according to a program stored in a random access memory (RAM) 112. The RAM 112 functions also as a main memory and a work area for the CPU 111. A read-only memory (ROM) 113 stores various programs and data. A display and operation unit interface (I/F) 114 displays information on a display and operation unit 115. The display and operation unit 115 has not only a display function but also a touch panel function, and controls an input from the user. A camera I/F 116 is connected with a camera module 117, and controls the camera module 117 to control image capturing. A proximity communication I/F 118 controls a proximity communication module 119 to achieve proximity communication. An external memory I/F 120 controls access to an external memory 121, such as a flash memory and a solid state disk. The external memory 121 stores an operating system program (hereinafter referred to as OS) 122 and various applications 123, and functions as a storage medium to/from which the client apparatus 101 can store and read data. A network I/F 124 is a network control unit, and controls a wireless LAN module 125 to enable connection with the network 104 via the wireless LAN base station 103.

The client apparatus 101 is an example of a portable terminal apparatus. The CPU 111 executes processing based on a program of the print application stored in the external memory 121. Thus, functions of the client apparatus 101 (functions of the print application) and processing related to the sequence chart and flowcharts related to the client apparatus 101 (described below) are achieved. To simplify descriptions, the following descriptions sometimes premise that the processing is performed by the print application.

FIG. 1C illustrates an example hardware configuration of an image output apparatus 102 illustrated in FIG. 1A. A CPU 142 controls operations of the entire image output apparatus 102. A random access memory (RAM) 143 functions as a main memory and a work area for the CPU 142, and is used as an image information rasterization area and an environmental data storage area. The RAM 143 also includes a non-volatile RAM (NVRAM) area. The memory capacity can be extended by using an option RAM connected to an extension port (not illustrated). A ROM 144 stores various types of fonts, a control program to be executed by the CPU 142, and various types of data. A network I/F 145 transmits and receives data to/from the client apparatus 101. A printer I/F 148 controls an interface with a printing unit 149 (printer engine). Access to an external memory 151 is controlled by an external memory I/F 150. The external memory 151 includes a flash memory or a solid state disk (SSD), and stores hardware information 152 and an identifier storage table 153 (described below). When the external memory 151 such as a hard disk is not connected, information used by the client apparatus 101 is stored in the ROM 144. An operation control unit I/F 146 controls an interface with an operation unit 147 used for setting copy and print processing of the image output apparatus 102. The operation unit 147 is provided with an operation panel for accepting an operation by the user. The operation panel is provided with switches for operations, LED indicators, and a liquid crystal display (LCD). The image output apparatus 102 may include a NVRAM (not illustrated) for storing print setting information from the operation panel. The CPU 142 is capable of communicating with the client apparatus 101 via the network I/F 145, and receives a print job from the client apparatus 101. The CPU 142 is also capable of notifying information in the image output apparatus 102 to the client apparatus 101. In the present exemplary embodiment, the network I/F 145 implements a service protocol and a plurality of protocols for receiving a print job. More specifically, these protocols include the LPR and Port9100 enabling print job reception via a local area network and the Internet Printing Protocol (IPP) suitable for print job reception via the Internet.

The CPU 142 performs processing based on a program stored in the external memory 151. Thus, functions of the image output apparatus 102 (described below) and processing of the sequence chart and flowcharts related to the image output apparatus 102 are achieved.

Processing performed by each of the above-described apparatuses will be described below. To clarify processing performed between the apparatuses, processing performed by the printing system will be described below with reference to the sequence chart illustrated in FIG. 2. These descriptions will clarify processing performed by the entire system according to the present exemplary embodiment. Processing performed by each apparatus will be described in detail below with reference to a relevant flowchart.

FIG. 2 is a sequence chart illustrating an example of image output processing performed by the printing system. Sequences in which electronic data stored in the client apparatus 101 is printed on a desired image output apparatus 102 in a series of processing will be clarified below with reference to FIG. 2. The following descriptions premise that the user has installed in the client apparatus 101 the print application used in the printing system and that the user has stored electronic data to be printed in the print application. Generally, there is provided an application for acquiring a desired application and installing it to a client apparatus such as a portable terminal. The user uses the application to specify and install a desired application. Generally, since portable terminals provide enhanced security, an application cannot access system resources and data of other applications. Therefore, the print application of a portable terminal employs a method for acquiring electronic data from an external server. The following descriptions premise that, by using this method, the user has already stored desired electronic data in the print application.

In step S201, to print electronic data by using the print application of the client apparatus 101, the user presses the "PRINT FROM PORTABLE TERMINAL" button displayed on the operation unit 147 of the image output apparatus 102 used for printing.

In step S202, the image output apparatus 102 displays on the operation unit 147, for example, the information code including its own job reception address, function information, status information, authentication necessity information, and an authentication uniform resource locator (URL). The format of the information code displayed here is the bar code, the QR Code (registered trademark), etc., so that the print application can decode the information code when captured by an imaging unit of the client apparatus 101.

The job reception address is an example of a print job reception address. The authentication URL is an example of an address for authentication.

In step S203, the user activates the print application for printing on the client apparatus 101. When this print application is activated, the information code displayed by the image output apparatus 102 can be captured with a camera.

In step S204, the user instructs the camera module 117 of the client apparatus 101 to capture this information code.

In step S205, in response to a user's imaging instruction, the camera module 117 of the client apparatus 101 captures the information code displayed on the operation unit 147 of the image output apparatus 102.

In step S206, the print application of the client apparatus 101 analyzes the contents of the captured information code to acquire relevant information (information acquisition). The information acquired as a result of analysis includes, for example, the job reception address, function information, status information, authentication necessity information, an authentication URL of the image output apparatus 102.

In step S207, the print application of the client apparatus 101 transmits a reading completion notification for the information code to the extracted job reception address of the image output apparatus 102 (completion notification transmission).

In step S208, upon reception of the above-described reading completion notification, the image output apparatus 102 clears the screen for displaying the information code and redisplays the regular screen (default screen). The print application transmits the reading completion notification at this timing because, depending on the imaging state, information analysis may not be possible only by capturing the information code. Therefore, the image output apparatus 102 clears the information code screen and redisplays the regular screen not at the timing of image capturing by the client apparatus 101 but at the timing of reception of the reading completion notification. In other words, the image output apparatus 102 clears the information code when it confirms that the information code has been analyzed.

In step S209, the print application determines whether authentication is necessary based on the extracted authentication necessity information.

When the print application determines that authentication is necessary (YES in step S209), then in step S210, the print application requests the authentication URL of the image output apparatus for an authentication HTML file (request transmission).

In step S211, the image output apparatus 102 transmits the authentication HTML file to the client apparatus 101. The print application receives the authentication HTML file (data reception).

Upon reception of the authentication HTML file, in step S212, the print application displays the authentication screen based on the acquired authentication HTML file (authentication screen display).

In step S213, on the authentication screen for authentication is displayed on the client apparatus 101, the user enters an identifier (ID) and password.

In step S214, the print application transmits to the image output apparatus 102 the user-input ID and password as authentication information to request authentication processing (authentication information transmission). The image output apparatus 102 receives the authentication processing request (authentication information reception).

Upon reception of the authentication processing request, in step S215, the image output apparatus 102 checks the registered ID and password and then performs authentication processing.

In step S216, the image output apparatus 102 transmits the result of authentication and the authentication identifier to the client apparatus 101. The authentication identifier is an identifier that can be maintained unique to the relevant image output apparatus 102, for example, a number starting from 0 and incremented for each authentication processing and a Universal Unique ID (UUID). When the print application transmits a print job to the image output apparatus 102, the print application describes the authentication identifier in the print job. The image output apparatus 102 checks the authentication identifier described in the received print job and, if the authentication identifier coincides with that issued by itself, performs the print processing. The print application receives the result of authentication and the authentication identifier from the image output apparatus 102 (result of authentication reception).

In step S217, the print application displays a message, as required, based on the status information extracted from the information code. More specifically, if the status information is a paper out status, the print application displays a message (status message) indicating paper out before displaying the print attribute setting screen (status message display).

In step S218, the print application displays the print attribute setting screen based on the function information included in the information code. The print application provides a user interface for enabling the user to set all of the main print functions. More specifically, the print application enables the user to set print attributes such as the number of copies, and the monochrome/color printing, one-sided/two-sided printing, stapling, punching, and bookbinding functions. The print application also enables the user to set only effective functions out of these functions based on the function information included in the information code. For example, when the function information of the information code includes the monochrome/color printing, one-sided/two-sided printing, and stapling functions, the print application sets only the number of copies, and the monochrome/color printing, one-sided/two-sided printing, and stapling functions. Since the number of copies can be achieved by the print application, it can be set by default.

In step S219, the user sets desired print attributes in the displayed print attribute setting screen.

After print attribute setting is completed, in step S220, the print application displays a print file selection screen.

In step S221, in the print file selection screen, the user selects a file (electronic data) to be printed and then instructs printing.

Upon reception of the instruction, in step S222, the print application transmits a print job to the job reception address of the image output apparatus 102 (print job transmission).

In step S223, the image output apparatus 102 receives the print job and then performs printing based on the print attributes specified by the user. In this processing, the image output apparatus 102 checks whether the authentication identifier included in the print job is one that has already been issued and, only when it is one that has already been issued, performs printing.

In step S224, the user acquires a print output.

Although the processing sequence has been described above, the image output apparatus 102 may be set to perform printing without authentication depending on the setting of the image output apparatus 102. In this case, the processing in steps S210 to S216 is skipped.

Figure 3B:
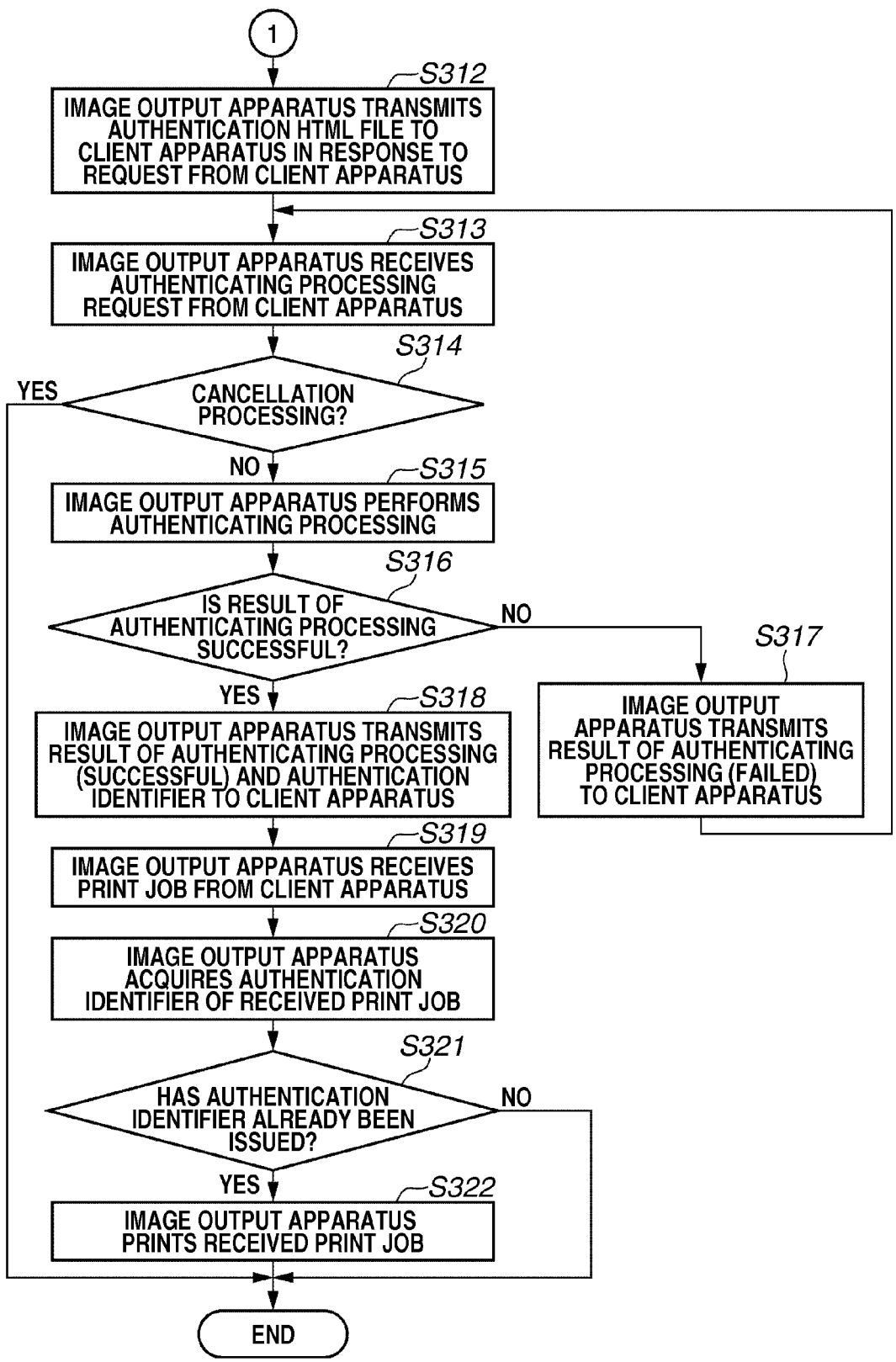
FIG. 3B is a flowchart illustrating an example of image output processing performed by the image output apparatus according to the first exemplary embodiment.
Figure 4A:
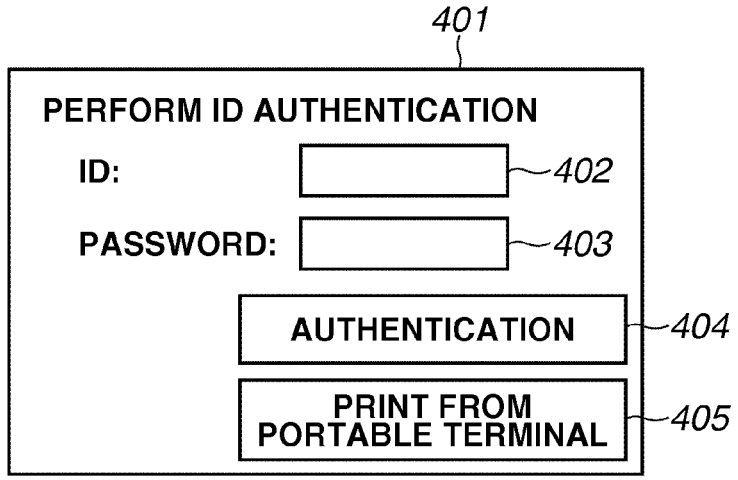
FIG. 4A illustrates an example screen displayed on an operation panel of the image output apparatus.
Figure 4B:
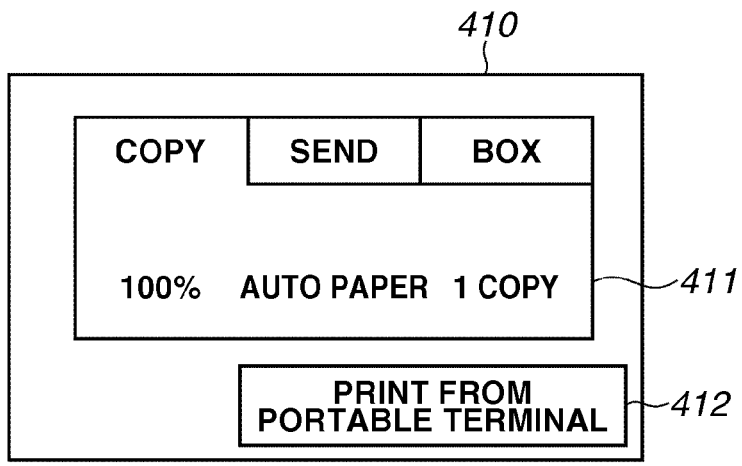
FIG. 4B illustrates an example screen displayed on the operation panel of the image output apparatus.

Processing performed by each apparatus will be described below with reference to the flowchart illustrated in FIGS. 3A and 3B. A series of print processing is started when a user having the client apparatus 101 goes to the image output apparatus 102 and then presses the "PRINT FROM PORTABLE TERMINAL" button displayed on the operation panel of the image output apparatus 102. FIGS. 4A and 4B illustrate example screens displayed on the operation panel of the image output apparatus 102. The image output apparatus 102 has a function of permitting any user or only a specific user to perform printing. When the image output apparatus 102 is set to permit any user to perform printing, the operation panel of the image output apparatus 102 is ready for setting and executing copy and scan operations. Specifically, when the image output apparatus 102 is set to permit any user to perform printing, the screen illustrated in FIG. 4B is displayed on the operation panel as a default screen (default screen display).

Otherwise, when the image output apparatus 102 is set to permit only a specific user to perform operations, the user needs to enter his or her ID and password from the operation panel of the image output apparatus 102. The user enters his or her ID and password. When the ID and password coincide with registered ones, he or she is permitted to perform regular operations. Specifically, when the image output apparatus 102 is set to permit only a specific user to perform operations, the default screen illustrated in FIG. 4A is displayed on the operation panel (default screen display). An operation panel screen 401 includes an ID input control 402 and a password input control 403. When the user enters his or her ID and password in these input fields and then presses the AUTHENTICATION button 404. Instead of entering an ID and password on this screen, the user may use an authentication card that enables the user to perform authentication without entering an ID and password. The operation panel screen 401 also includes the "PRINT FROM PORTABLE TERMINAL" button 405 for performing printing from the client apparatus 101.

An operation panel screen 410 illustrated in FIG. 4B includes an operation screen 411 of the image output apparatus 102 and a "PRINT FROM PORTABLE TERMINAL" button 412 for performing printing from the client apparatus 101. The operation panel screen 401 illustrated in FIG. 4A is displayed as the default screen. When the user enters correct ID and password, the operation panel screen 410 illustrated in FIG. 4B is displayed.

In step S301, the image output apparatus 102 (CPU 142) collects the status information of the image output apparatus 102 itself. In this step, the CPU 142 collects information stored in the hardware information 152 stored in the external memory 151 in the image output apparatus 102 and information stored in the RAM 143 therein. The information collected by the CPU 142 includes a job reception address, function information, status information, authentication necessity information of the image output apparatus 102. These pieces of information will be described below. An example of problems assumed by the present application will be described in detail below. When the information code includes only the address information, the client apparatus 101 cannot recognize printer functions and therefore does not know which print function should be offered to the user. Further, the status information of the printer is not notified to the portable terminal only by reading the information code including only the address information. For example, if paper to be used for printing is not present in the printer, the print application on the portable terminal cannot notify the user of paper out, and the user may possibly be unable to perform desired printing. To solve these problems, the image output apparatus 102 according to the present application collects the following three pieces of information.

Job reception address: 192.168.1.99
Function information: Monochrome/color, one-sided/two-sided, stapling (upper left, upper right, left, right), and bookbinding
Status information: A4 paper out The CPU 142 does not necessarily collect all of the job reception addresses (address information), function information, and status information. For example, the CPU may collect at least the job reception address and function information, or at least the job reception address and status information. Although, in the present application, the print processing using the job reception address, function information, and status information will be described below, printing may be performed by using at least the job reception address and the function information or at least the job reception address and the status information, as described above.

FIG. 5A illustrates example data in the status information. This status information data is described as text data, and each data item is delimited by a semicolon (;). Each data item includes a data name, a colon (:), and one or more parameters. When there is a plurality of parameters for a data item, each parameter is delimited by a comma (,). When a data item has another parameter, the parameter is described after a colon (:).

A line 501 describes a job reception address, and includes a data name "DestinationAddress" and a parameter "192.168.1.99". A line 502 describes function information, and includes a data name "DeviceCapability" and parameters "Color", "Duplex", "Staple (UL UR R L)", and "Booklet". The parameters indicate monochrome/color printing, one-sided/two-sided printing, stapling (upper left, upper right, left, right), and bookbinding, respectively. A line 503 describes status information, and includes a data name "DeviceStatus" and a parameter "PaperEmpty:A4". FIG. 5A illustrates an example of status information collected by the CPU 142 in step S301. In a line 504, a parameter "No" is described following "Ruth" indicating the authentication necessity information.

In step S302, the CPU 142 determines whether the image output apparatus 102 is set to require ID/password authentication based on the parameters following "Ruth". When the image output apparatus 102 is set not to require ID/password authentication, i.e., when the parameter following "Ruth" is "No" (NO in step S302), the CPU 142 proceeds to step S304. When the image output apparatus 102 is set to require ID/password authentication, i.e., when the parameter following "Ruth" is "Yes" (YES in step S302), the CPU 142 proceeds to step S303. When the user presses (selects) the "PRINT FROM PORTABLE TERMINAL" button 405 in the screen illustrated in FIG. 4A, the CPU 142 adds a parameter "Yes" following "Ruth". Otherwise, when the user presses (selects) the "PRINT FROM PORTABLE TERMINAL" button 412 in the screen illustrated in FIG. 4B, the CPU 142 adds a parameter "No" following "Ruth".

In step S303, the CPU 142 adds an authentication URL to the status information data illustrated in FIG. 5A. FIG. 5B illustrates an example of status information data to which an authentication URL is added. Lines 511 (job reception address) to 513 (status information) are similar to the lines 501 to 503 illustrated in FIG. 5A. In a line 514 (ID/password authentication necessity information) a parameter "Yes" is described following "Ruth". In a line 515, a parameter "http://192.168.1.99/authentication/" is added following "AuthURL" indicating the authentication URL. As described above, when the image output apparatus 102 is set to perform ID/password authentication illustrated in FIG. 4A, the status information data is as illustrated in FIG. 5B. When the image output apparatus 102 is set not to perform ID/password authentication illustrated in FIG. 4B, the status information data is as illustrated in FIG. 5A.

Figure 4C:
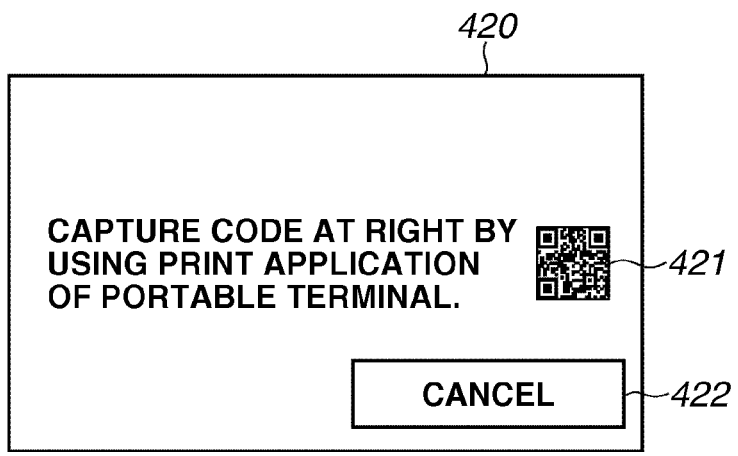
FIG. 4C illustrates an example screen including information code displayed on the operation panel of the image output apparatus.

In step S304, the CPU 142 generates an information code based on the collected status information and then displays on the operation panel a screen including the generated information code. FIG. 4C illustrates an example screen including the information code. A screen 420 includes the information code. The information code 421 illustrates an example of an object that is coded status information. A CANCEL button 422 can be used by the user to cancel the print processing. The information code may be in any format as long as it indicates the status information data illustrated in FIG. 5A or 5B. For example, the information code may be a one- or two-dimensional bar code. In step S304, after the screen including the information code is displayed, the user reads the information code by using an imaging apparatus of the client apparatus 101. An example of information processing of the client apparatus 101 will be described below with reference to the flowcharts. After reading the information code, the client apparatus 101 transmits the reading completion notification to the image output apparatus 102.

In step S305, the CPU 142 confirms the reception of the notification from the client apparatus 101. In step S306, the CPU 142 determines whether the received notification is a cancellation notification. When the cancellation notification is received (YES in step S306), the user has cancelled the print processing, and the CPU 142 proceeds to step S311.

In step S311, the CPU 142 redisplays the regular screen, i.e., the screen illustrated in FIG. 5A or 5B on the operation panel. When the cancellation notification is not received (NO in step S306), the CPU 142 proceeds to step S307.

In step S307, the CPU 142 determines whether the notification is a reading completion notification. When the reading completion notification is not received, for example, a packet of other type is received (NO in step S307), the CPU 142 returns to step S305 to reconfirm the notification received from the client apparatus 101. When the reading completion notification is received (YES in step S307), the CPU 142 proceeds to step S308.

In step S308, the CPU 142 redisplays the regular screen, i.e., the screen illustrated in FIG. 5A or 5B on the operation panel.

In step S309, the CPU 142 determines whether the image output apparatus 102 is set to perform ID/password authentication based on the parameters following "Ruth". When the image output apparatus 102 is set not to perform ID/password authentication (NO in step S309), the CPU 142 proceeds to step S310.

In step S310, the CPU 142 receives a print job from the client apparatus 101, performs printing, and then ends this processing (exits the flowchart). A print job to be received will be described in detail below. When the image output apparatus 102 is set to perform ID/password authentication (YES in step S309), the CPU 142 proceeds to step S312.

In step S312, in response to the request from the client apparatus 101, the CPU 142 transmits an authentication HTML file. Specifically, the CPU 142 reads an HTML file stored in the script information 154 of the external memory 151 and then transmits it to the client apparatus 101. FIG. 6 illustrates an example of an authentication HTML file transmitted by the image output apparatus 102 in step S312. A line 601 is a header portion of the HTML file. A line 602 describes a title name "AUTHENTICATION" of the HTML page. A line 603 indicates the start of the HTML body. A line 604 describes a character string to be displayed on this page. A character string 604 is displayed as "ID AUTHENTICATION" on the client apparatus 101. Lines 605 to 610 are descriptions for defining an entry form. A line 605 describes form actions, i.e., receive input data in the post format and execute the "/bin/auth.exe" program for the input data. A line 606 describes the first input field: a character string "ID:" and an input control display having the text attribute. A line 607 describes the second input field: a character string "PASSWORD:" and an input control display having the password attribute. A line 608 describes a form transmission button having a value "AUTHENTICATION". A line 609 also describes a form transmission button having a value "CANCEL". A line 610 indicates the end of form description. A line 611 indicates the end of the HTML file. How this HTML file is displayed and processed by the client apparatus 101 will be described below with reference to the flowchart (FIG. 8) illustrating an example of information processing by the client apparatus 101.

In step S313, the CPU 142 receives from the client apparatus 101 a form data processing request (authentication processing request) for the transmitted authentication HTML file.

In step S314, based on the received form data, the CPU 142 determines whether the requested processing is cancellation processing. When the requested processing is cancellation processing (YES in step S314), the user has cancelled the printing procedure and the CPU 142 exits this flowchart. Otherwise, when the requested processing is not cancellation processing (NO in step S314), the CPU 142 proceeds to step S315.

In step S315, the CPU 142 performs authentication processing based on the form data received from the client apparatus 101. More specifically, based on the user ID and password included in the form data, the CPU 142 searches for matched user ID and password registered in an authentication database 155 in the external memory 151 of the image output apparatus 102, and determines whether the combination of the user ID and password is correct.

In step S316, the CPU 142 determines the result of authentication processing is successful. When authentication processing is failed (NO in step S316), the CPU 142 proceeds to step S317.

In step S317, the CPU 142 transmits the result of failed authentication processing to the client apparatus 101 and then returns to step S313. When authentication processing is successfully completed (YES in step S316), the CPU 142 proceeds to step S318.

In step S318, the CPU 142 transmits the result of successful authentication processing and the authentication identifier to the client apparatus 101. The authentication identifier transmitted by the image output apparatus 102 will be described below. The uniqueness of this authentication identifier is maintained within the image output apparatus 102. In the present exemplary embodiment, the Universal Unique ID (UUID) will be used since the uniqueness can be easily guaranteed. As a result of successful authentication, the image output apparatus 102 transmits this identifier to the client apparatus 101, and is included in a job ticket when the client apparatus 101 transmits a print job to the image output apparatus 102. Including such an identifier in a job ticket enables printing only a print job from the client apparatus 101 in which authentication is successfully completed. In the present exemplary embodiment, the CPU 142 generates "69536026-ac4f-8879-0a042c309ff6" as the UUID and then transmits it to the client apparatus 101. At the same time, the CPU 142 stores the generated UUID in the identifier storage table 153 in the external memory 151 of the image output apparatus 102. The authentication identifier is an example of authentication identification information.

Figures 7A, 7B:
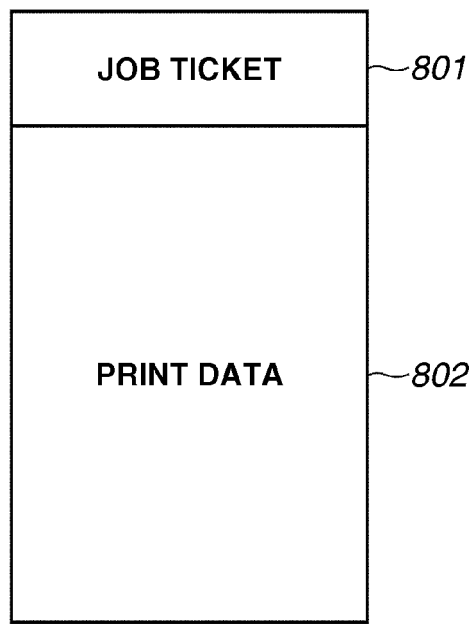
FIG. 7A illustrates an example configuration of a print job.
FIG. 7B illustrates an example of a job ticket.

In step S319, the CPU 142 receives a print job from the client apparatus 101. FIG. 7A illustrates an example configuration of a print job. FIG. 7B illustrates an example of a job ticket. Referring to FIG. 7A, the job configuration includes a job ticket 801 and print data 802. The CPU 142 performs printing by receiving and processing the print job illustrated in FIG. 7A. The job ticket is text data including tags and values. Referring to FIG. 7B, a line 811 is an authentication identifier that includes "69536026-ac4f-8879-0a042c309ff6" generated by the CPU 142 and described in the <uuid> tag. A line 812 indicates the number of copies "1" described in the <copies> tag. A line 813 is a two-sided printing setting, and describes "off" which means that two-sided printing is not performed. A line 814 is a stapling setting, and describes "off" which means that stapling is not performed. A line 815 is a punching setting, and describes "off" which means that punching is not performed. A line 816 is a bookbinding setting, and describes "off" which means that bookbinding is not performed. When stapling is to be performed at the upper left position, a value "UL" is described. When punching is to be performed, a value "on" is described.

In step S320, the CPU 142 acquires the authentication identifier from the job ticket 801 of the received print job.

In step S321, the CPU 142 determines whether the authentication identifier acquired from the job ticket 801 is one that has already been issued. To make this determination, the CPU 142 checks whether the authentication identifier acquired from the job ticket 801 coincides with any one stored in the identifier storage table 153 in the external memory 151. When the authentication identifier acquired from the job ticket 801 does not coincide with any one stored in the identifier storage table 153 (NO in step S321), the received print job has not undergone authentication processing, and the CPU 142 exits this flowchart without performing printing.

When the authentication identifier acquired from the job ticket 801 coincides with any one stored in the identifier storage table 153 (YES in step S321), then in step S322, the CPU 142 prints the received print job.

The image output apparatus 102 performs the above-described image output processing. Specifically, in step S304, to display the information code based on the status information and function information, the client apparatus 101 that has captured the information code can display a setting screen based on suitable status information and suitable function information of the image output apparatus 102.

Figure 8:
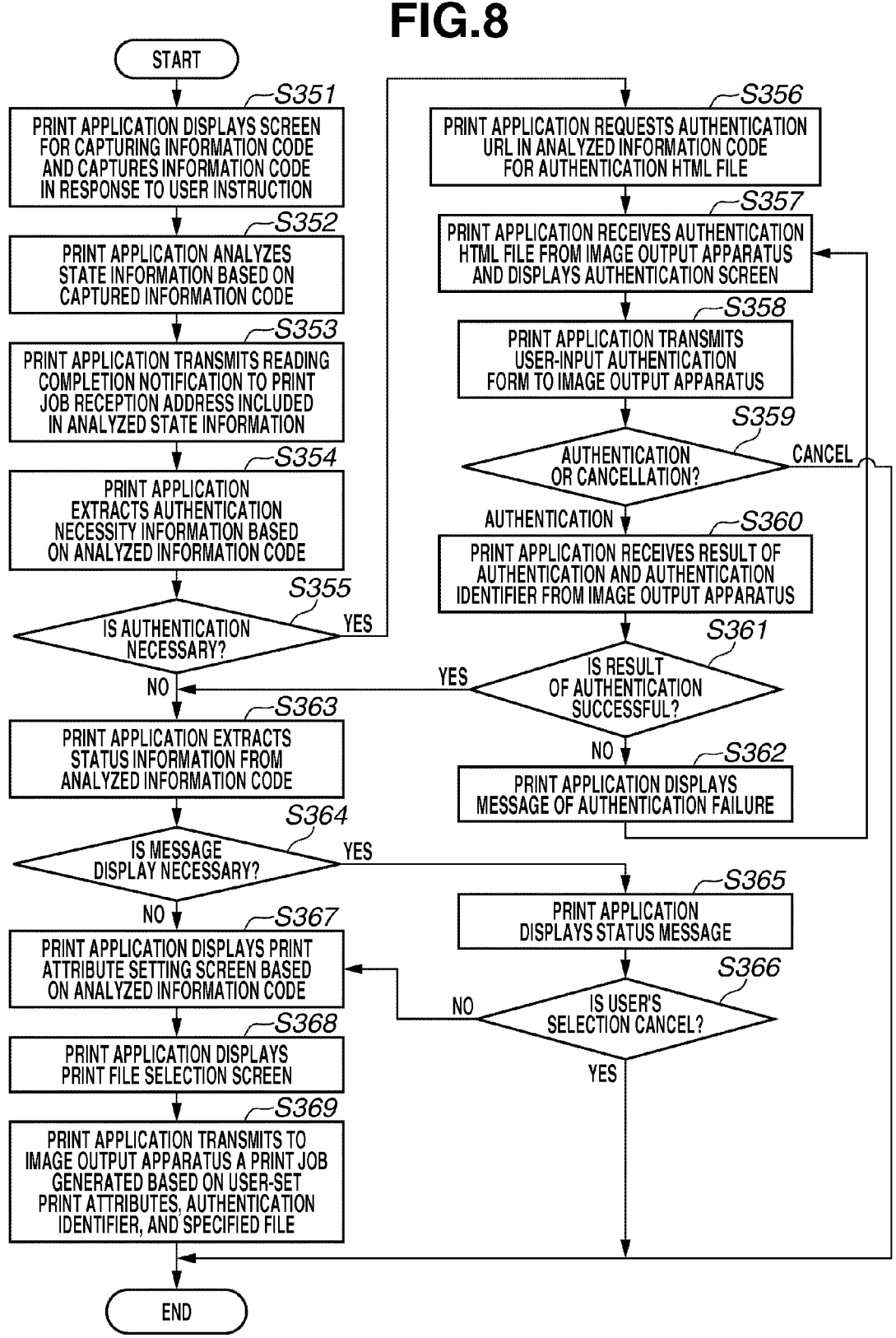
FIG. 8 is a flowchart illustrating an example of information processing performed by the client apparatus.

Processing performed by the client apparatus 101 will be described in detail below with reference to the flowchart illustrated in FIG. 8. A series of print processing is started when the print application is activated on the client apparatus 101 in response to a user's instruction. When the print application is activated by the relevant instruction, in step S351, the print application displays a screen for capturing the information code 421 of the image output apparatus 102 and then the user instructs to capture the information code 421 on this screen.

In step S352, the print application analyzes the status information of the image output apparatus 102 based on the captured information code. The result of analysis is as illustrated in FIG. 5A or 5B depending on the authentication setting of the image output apparatus 102.

In step S353, the print application transmits an analysis completion notification to the job reception address of the image output apparatus 102 included in the analyzed status information. More specifically, the print application transmits the analysis completion notification to "192.168.1.99", which is the value of "DestinationAdress" in the line 501. The completion notification may be transmitted in any format as long as it can be recognized by the image output apparatus 102.

In step S354, the print application extracts the authentication necessity information from the result of information code analysis. When the information code is as illustrated in FIG. 5A, the authentication necessity information is "No", which is the value of "Ruth" in the line 504. When the information code is as illustrated in FIG. 5B, the authentication necessity information is "Yes", which is the value of "Ruth" in the line 514.

In step S355, the print application determines the necessity of authentication. When the information code is as illustrated in FIG. 5B, i.e., the authentication necessity information is "Yes" (YES in step S355), the image output apparatus 102 performs processing necessary for authentication.

In step S356, the print application requests the authentication URL in the analyzed information code for an authentication HTML file. More specifically, since the analyzed information code is as illustrated in FIG. 5B, the print application requests "http://192.168.1.99/authentication/" (the value of "AuthURL" in the line 515) for an authentication HTML file.

Figure 9A:
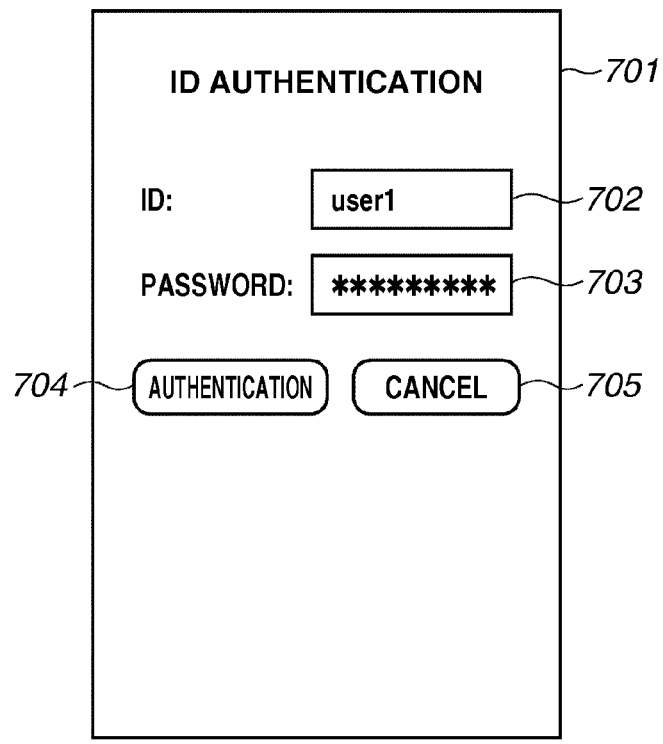
FIG. 9A illustrates an example of an authentication screen.

In step S357, the print application receives the authentication HTML file from the image output apparatus 102 and then displays the authentication screen. The authentication HTML file to be received is as illustrated in FIG. 6. FIG. 9A illustrates an example authentication screen displayed by the print application of the client apparatus 101. A screen 701 is an authentication screen based on the received authentication HTML file. A control 702 is a control for entering an ID. A control 703 is a control for entering a password. To perform authentication after entering an ID and password, the user taps the AUTHENTICATION button 704. To stop authentication to cancel the print processing, the user taps the CANCEL button 705.

In step S358, the print application transmits to the image output apparatus 102 an authentication form including the user-input ID and password and information about the tapped button.

In step S359, the print application determines whether the user has tapped the AUTHENTICATION button 704 or the CANCEL button 705. When the user has tapped the AUTHENTICATION button 704 (AUTHENTICATION in step S359), the print application performs authentication processing. Otherwise, when the user has tapped the CANCEL button 705 (CANCEL in step S359), the print application ends the print processing (exits the flowchart).

In step S360, the print application receives the result of authentication and the authentication identifier from the image output apparatus 102. When the result of authentication is failed, the authentication identifier is not received.

In step S361, the print application determines the result of authentication. When the result of authentication is failed (NO in step S361), the print application advances processing to step S362.

In step S362, the print application displays a message about failed authentication to the user and then redisplays the authentication screen in step S357. When the result of authentication is successful (YES in step S361), the print application advances processing to step S363. Otherwise, when the information code is as illustrated in FIG. 5A, i.e., the authentication necessity information is "No" (NO in step S355), the print application advances processing to step S363.

In step S363, the print application extracts the status information from the analyzed information code. Referring to the information code illustrated in FIGS. 5A and 5B, the status information is "PaperEmpty:A4", which is the value of "DeviceStatus" in the line 503 or 513. This means that A4 paper is out.

In step S364, the print application determines whether message display is necessary. In this case, since the status information is present, i.e., message display is necessary (YES in step S364), the print application advances processing to step S365. When the status information is not present, i.e., message display is not necessary (NO in step S364), the print application advances processing to step S367.

Figure 9B:
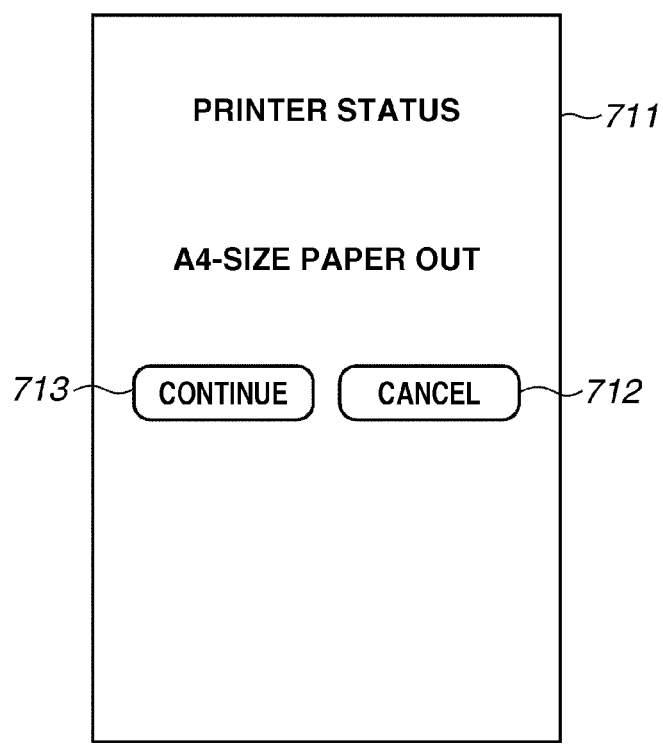
FIG. 9B illustrates an example of a message display screen.

In step S365, the print application displays the status information as a message to the user. FIG. 9B illustrates an example of a message screen displayed on the client apparatus 101 by the print application. A message screen 711 includes a CANCEL button 712 and a CONTINUE button 713 for accepting the message and continuing processing. The user taps either button on this screen.

In step S366, the print application determines the processing selected by the user. When the user taps the CANCEL button 712 (YES in step S366), the print application ends the print processing (exits the flowchart). When the user taps the CONTINUE button 713 (NO in step S366), the print application advances processing to step S367.

Figure 9C:
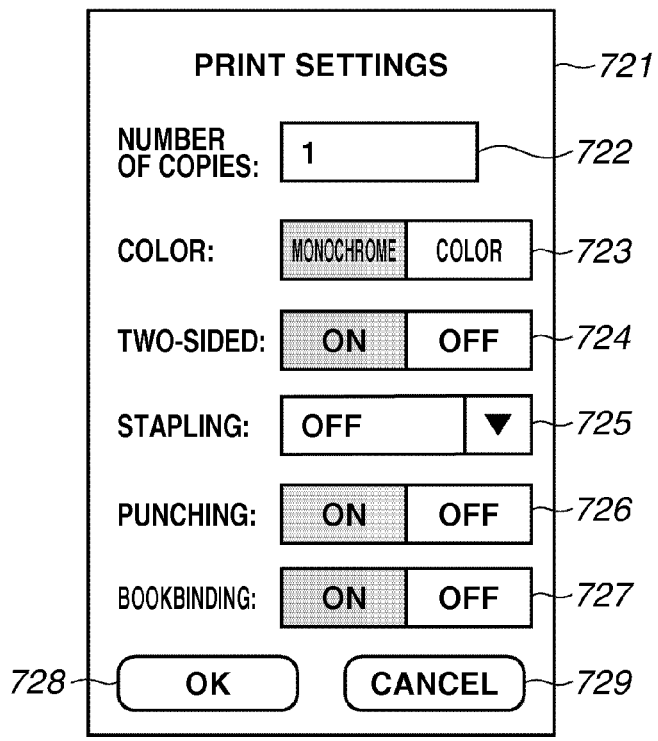
FIG. 9C illustrates an example of a print attribute setting screen according to the first exemplary embodiment.

In step S367, the print application displays the print attribute setting screen based on the analyzed information code. The print application performs this processing based on the function information on the image output apparatus 102 described in the information code. Based on the result of analysis of the information code illustrated in FIGS. 5A and 5B, the function information of the image output apparatus 102 is indicated by "DeviceCapability" in the line 502 or 512. Based on the lines 502 and 512, the print application recognizes that monochrome/color printing, one-sided/two-sided printing, stapling (upper left, upper right, right, left), and bookbinding can be specified. FIG. 9C illustrates an example of a print attribute setting screen displayed by the print application based on this information. A print attribute setting screen 721 displays the following controls. A control 722 is used to specify the number of copies. A control 723 is used to specify monochrome/color printing. A control 724 is used to specify two-sided printing. A control 725 is used to specify stapling. A control 726 is used to specify punching. A control 727 is used to specify bookbinding. An OK button 728 is used to proceed to the following step after completion of print attribute setting. A CANCEL button 729 is used to end the print processing. Although all of the functions are enabled in this example, some functions may be disabled (function limitation) depending on the ability information of the image output apparatus 102.

Figure 9D:
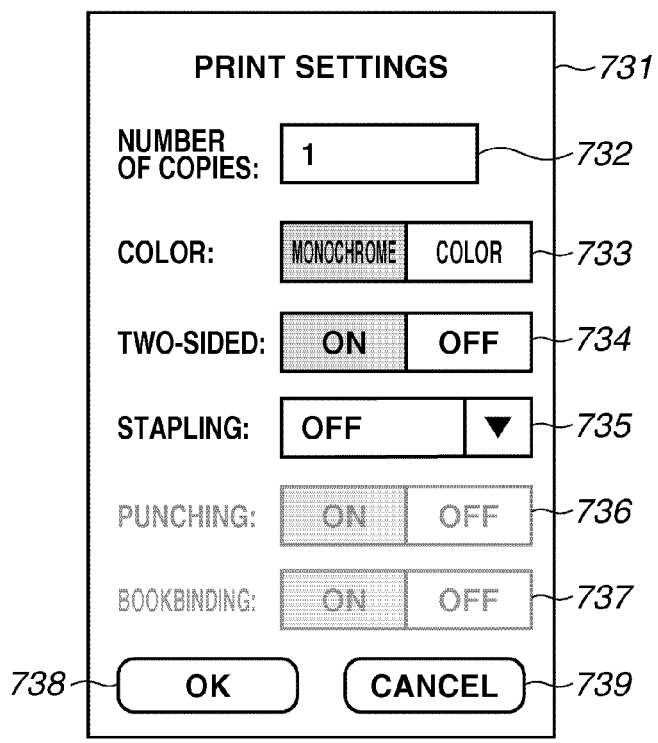
FIG. 9D illustrates an example of a print attribute setting screen according to the first exemplary embodiment.

More specifically, assume a case where, for example, the information code "DeviceCapability" is "Color, Duplex, Staple:UL UR R L". In this case, the monochrome/color printing, one-sided/two-sided printing, and stapling settings are enabled, and the punching and bookbinding settings are disabled. With this ability information of the image output apparatus 102, the print application displays a print attribute setting screen 731 illustrated in FIG. 9D. Controls 732 (for setting the number of copies) to 735 (for setting stapling) illustrated in FIG. 9D are similar to the controls 722 to 725 illustrated in FIG. 9C. Controls 736 (for setting punching) and 737 (for setting bookbinding) are disabled or grayed out.

Even with a difference between functions of the image output apparatuses 102 in this way, the print application reads the ability information generated by each image output apparatus 102 to enable print attribute setting suitable for each image output apparatus 102.

Figure 9E:
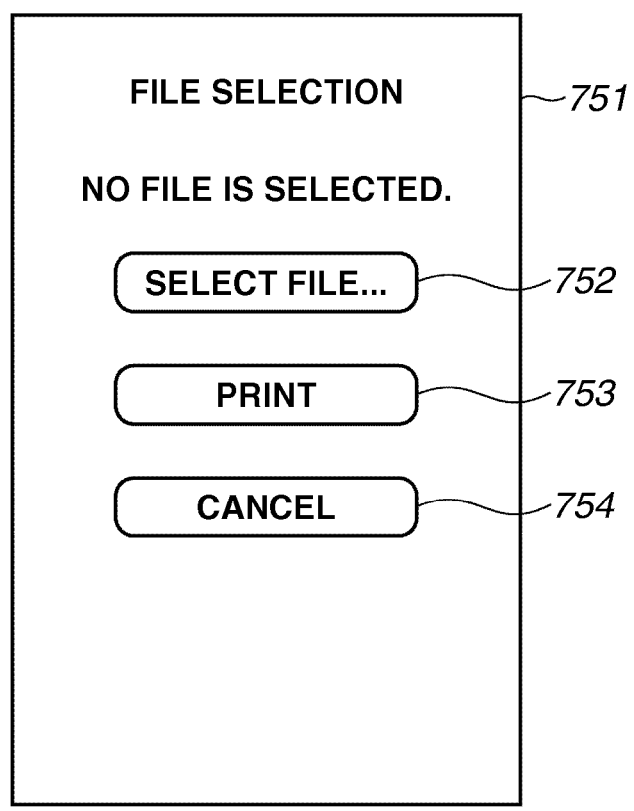
FIG. 9E illustrates an example of a print file selection screen.

In step S368, the print application displays a print file selection screen. FIG. 9E illustrates an example of a print file selection screen displayed by the print application. A print file selection screen 751 includes a SELECT FILE button 752 for file selection. When the user taps the SELECT FILE button 752, the user can select a file. The print file selection screen 751 further includes a PRINT button 753. When the user taps the PRINT button 753 after selecting a file, the print application transmits the print job to the image output apparatus 102. The print file selection screen 751 further includes a CANCEL button 754. When the user taps the CANCEL button 754, the print application cancels the print processing.

In step S368, the user selects a print file and then taps the PRINT button 753. Then, the print application advances processing to step S369.

In step S369, the print application generates a print job based on the user-set print attributes, the authentication identifier received from the image output apparatus 102, and the specified file. This print job is illustrated in FIG. 7. The print application transmits this print job to the image output apparatus 102 and then ends the processing (exits the flowchart).

As described above, providing on the client apparatus 101 a print application including the functions of a plurality of image output apparatuses 102 and acquiring function information of the image output apparatus 102 enable the following processing. Specifically, the print application acquires the function information of the image output apparatus 102 by using an imaging apparatus of the client apparatus 101, thus enabling acquiring a job reception address (address of the job transmission destination) regardless of the network environment. Further, based on the function information of the image output apparatus 102, the print application enables the user to select only functions applicable to the type of each image output apparatus 102. Since the print application of the client apparatus 101 acquires the status information of the image output apparatus 102 regardless of the network environment, the print application can know the printer status before the user performs print setting and instructs printing. Further, even when an ID and password are required to enable the image output apparatus 102 to perform accounting management, performing authentication on the client apparatus 101 enables performing printing similar to printing from other client apparatuses 102.

A second exemplary embodiment of the present invention will be described below.

Figure 10A:
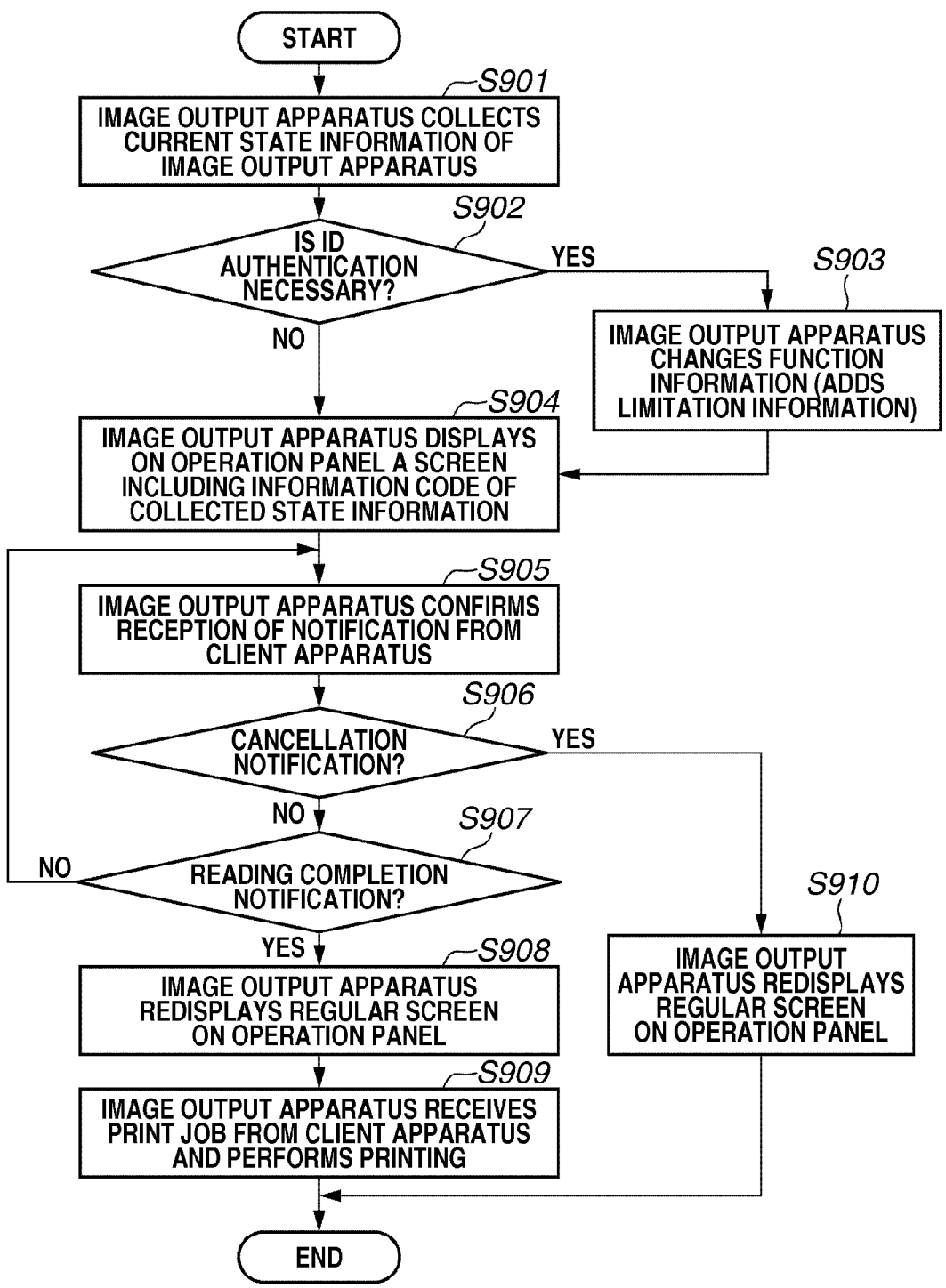
FIG. 10A is a flowchart illustrating an example of image output processing performed by an image output apparatus according to a second exemplary embodiment.

Processing performed by each client apparatus 102 will be described below with reference to the flowcharts illustrated in FIGS. 10A and 10B. Since the system configuration is similar to the first exemplary embodiment, redundant description and illustration will be omitted.

First of all, differences of the present exemplary embodiment from the first exemplary embodiment will be described below. In the first exemplary embodiment, when the image output apparatus 102 is set to perform authentication, authentication processing is performed on the client apparatus 101. In the present exemplary embodiment, the image output apparatus 102 changes the function information without performing this authentication processing. More specifically, suppose a case where the image output apparatus 102 is provided with the monochrome/color printing, one-sided/two-sided printing, stapling, punching, and bookbinding functions. When the image output apparatus 102 is set not to require authentication, the CPU 142 describes in the information code all of these functions as the function information. However, when the image output apparatus 102 is set to require authentication, the CPU 142 does not include some functions in the function information although it is provided with these functions.

More specifically, when the image output apparatus 102 is set to require authentication, the CPU 142 changes the function information to specify monochrome setting, two-sided setting, no stapling setting, no punching setting, and no bookbinding setting. Regularly, when the image output apparatus 102 is set not to require authentication, it means that any user is permitted to perform printing by using all of the functions. However, when the image output apparatus 102 is set to require authentication, it means that only a certain user is permitted to perform printing and, therefore, that unspecified users are not permitted to use all of the functions. Therefore, when the image output apparatus 102 requires authentication, the CPU 142 performs control in such a way that the intended functions are not intentionally included in the function information to prevent the client apparatus 101 from using these functions.

The user having the client apparatus 101 goes to the image output apparatus 102 and then presses the "PRINT FROM PORTABLE TERMINAL" button displayed on the operation panel of the image output apparatus 102. Details of this processing according to the present exemplary embodiment are similar to the first exemplary embodiment, and redundant description will be omitted.

In step S901, the image output apparatus 102 (CPU 142) collects the current status information of the image output apparatus 102 itself. Details of this processing according to the present exemplary embodiment are similar to the first exemplary embodiment, and redundant description will be omitted.

In step S902, the CPU 142 determines whether the image output apparatus 102 is set to require ID/password authentication. When the image output apparatus 102 is set not to require ID/password authentication (NO in step S902), the CPU 142 proceeds to step S904. When the image output apparatus 102 is set to require ID/password authentication (YES in step S902), the CPU 142 proceeds to step S903.

In step S903, the CPU 142 changes the function information in the status information data illustrated in FIG. 5B. More specifically, the image output apparatus 102 is intended to be provided with the monochrome/color printing, one-sided/two-sided printing, stapling, punching, and bookbinding functions. However, in step S903, the CPU 142 changes the function information to specify monochrome setting, two-sided setting, no stapling setting, no punching setting, and no bookbinding setting.

After changing the function information, the ability information describes "DeviceCapability: Mono, Simplex;". Processing in step S904 and subsequent steps is similar to that of the first exemplary embodiment, and redundant description will be omitted.

Figure 11:
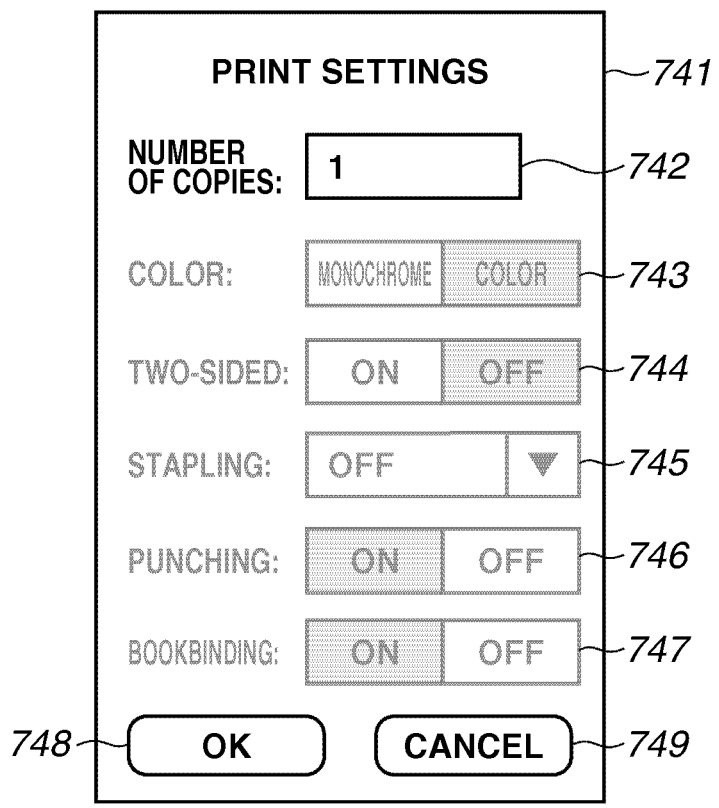
FIG. 11 illustrates an example of a print attribute setting screen according to the second exemplary embodiment.

Processing performed by the print application of the image output apparatus 102 will be described below with reference to the flowchart illustrated in FIG. 10B. This flowchart is similar to the flowchart for the print application illustrated in FIG. 8 except that the authentication processing is not performed. Therefore, the operation of each step is similar to the first exemplary embodiment, and redundant description will be omitted. The print attribute setting screen displayed by the print application in step S958 is illustrated in FIG. 11. Although this screen is similar to that illustrated in FIGS. 9C and 9D, functions other than the setting of the number of copies are disabled or grayed out. In this print attribute setting screen, the user taps an OK button 748 to execute printing or a CANCEL button 749 to cancel printing.

In the present exemplary embodiment, even if the image output apparatus 102 requires ID/password authentication to perform accounting management, printing is possible without performing authentication on the client apparatus 101, as described above. Further, when the image output apparatus 102 requires ID/password authentication, printing from the client apparatus 101 such as a portable terminal is possible with some print functions limited.

With the printing system according to the first exemplary embodiment, when the image output apparatus 102 is set to require authentication, printing is not possible if authentication from the client apparatus 101 failed. With the printing system according to the second exemplary embodiment, when the image output apparatus 102 is set to require authentication, the image output apparatus 102 offers print functions in response to a print request from the client apparatus 101 with predetermined functions limited.

A printing system according to a third exemplary embodiment of the present invention will be described below. Specifically, when the image output apparatus 102 is set not to require authentication, the image output apparatus 102 performs printing from the client apparatus 101 based on the regular function information. On the other hand, when the image output apparatus 102 is set to require authentication, the image output apparatus 102 divides the processing into two pieces. One piece of processing is the print processing based on the regular function information when authentication from the client apparatus 101 is successfully completed. When the result of authentication is failed, the image output apparatus 102 performs the print processing by using the predetermined limitation functions as the ability information.

Specifically, when the print application receives the result of successful authentication processing from the image output apparatus 102, the print application displays the print setting screen as illustrated in FIG. 9C or 9D based on the function information included in the information code. Otherwise, when the print application receives the result of failed authentication processing from the image output apparatus 102, the print application displays the print setting screen as illustrated in FIG. 11 based on the predetermined function information.

Providing such a printing system enables a user having neither ID nor password for authentication to perform minimum printing even when the image output apparatus 102 is set to require authentication.

A fourth exemplary embodiment of the present invention will be described below.

In the first to third exemplary embodiments, the client apparatus 101 reads the information code, including the status information of the image output apparatus 102, displayed on the operation panel of the image output apparatus 102. Since this processing requires that the client apparatus 101 acquires the status information of the image output apparatus 102, the following alternative methods can be used.

One method is that a short-distance communication module is installed in the client apparatus 101 and the image output apparatus 102, and the print application of the client apparatus 101 acquires the information code. This method enables wirelessly transmitting information from the client apparatus 101 to the image output apparatus 102. In the first exemplary embodiment, when authentication is necessary, the image output apparatus 102 generates the authentication identifier, transmits it to the client apparatus 101, and determines whether the authentication identifier is to be included in a job ticket for printing. However, when the short distance communication module is used, there is provided a method for transmitting the individual identification number of the client apparatus 101 to the image output apparatus 102 during wireless communication. At this time, the image output apparatus 102 stores the individual identification number of the client apparatus 101 in a predetermined area of the external memory 151. Further, when the print application of the client apparatus 101 transmits a print job, the print application describes the individual identification number in the job ticket. Through such processing, when the image output apparatus 102 is set to require authentication, the image output apparatus 102 acquires the individual identification number included in the job ticket of the print job received from the client apparatus 101. The image output apparatus 102 checks whether the acquired individual identification number coincides with the one stored in the external memory 151 and, only when the acquired individual identification number coincides with the stored one, performs printing. This processing enables the print processing in a case where the image output apparatus 102 is set to require authentication in the first exemplary embodiment.

In the first to third exemplary embodiments, the status information of the image output apparatus 102 can be exchanged by e-mail. More specifically, the image output apparatus 102 embeds e-mail address information into the information code 421 of the image output apparatus 102. The client apparatus 101 captures this information. Then, the client apparatus 101 acquires the e-mail address from the information code (e-mail address acquisition). The client apparatus 101 sends an empty e-mail to the e-mail address of the image output apparatus 102. Upon reception of the empty e-mail (mail reception), the image output apparatus 102 sends back to the client apparatus 101 an e-mail (reply e-mail) having the information illustrated in FIG. 5 as a body text (mail transmission). Based on the status information, the printing system performs similar processing to the first to third exemplary embodiments.

The present exemplary embodiment enables the user to easily identify an image output apparatus subjected to image output and then perform desired printing.

The present invention is also achieved by performing the following processing. Specifically, software (a program) for implementing the functions of the above-described exemplary embodiments is supplied to a system or apparatus via a network or various storage media, and a computer (or CPU, microprocessor unit (MPU), etc.) of the system or apparatus reads the program and executes it.

The above-described exemplary embodiments enable the user to easily identify an image output apparatus subjected to image output and then perform desired printing. The above-described exemplary embodiments further enable the user to easily identify an image output apparatus subjected to image output, recognize the status of the identified image output apparatus, set print attributes suitable for the functions of the identified image output apparatus, and output an image.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-029709 filed Feb. 14, 2012, which is hereby incorporated by reference herein in its entirety.

What is claimed is:

1. An image output apparatus comprising:
a display unit configured to display on an operation unit a screen including an object indicating that printing is to be performed from a portable terminal apparatus;
a generation unit configured to, when the object is selected, generate an information code indicating address information and function information of the image output apparatus or an information code indicating the address information and status information of the image output apparatus and, when authentication is necessary, the generation unit generates the information code to include information indicating a necessity of authentication and an address for authentication;
a transmission unit configured to, in response to a request from the portable terminal apparatus having read the information code, transmit to the portable terminal apparatus data for entering authentication information on the portable terminal apparatus;
an authentication information reception unit configured to receive the authentication information entered on the portable terminal apparatus;
a reply unit configured to, when authentication is successfully completed as a result of authentication processing based on the authentication information received by the authentication information reception unit, sends authentication identification information and a result of successful authentication back to the portable terminal apparatus, a reception unit configured to receive a print job from the portable terminal apparatus having read the information code;

an acquisition unit configured to acquire authentication identification information from the print job received by the reception unit; and an output unit configured to, when the authentication identification information acquired by the acquisition unit is one that has already been issued, output the print job received by the reception unit, wherein the display unit displays the information code on the screen.

2. The image output apparatus according to claim 1, wherein, upon reception of a reading completion notification for the information code from the portable terminal apparatus, the display unit deletes the information code from the screen.

3. The image output apparatus according to claim 1, wherein, when the screen is a screen requiring authentication, the generation unit generates the information code that further includes the information indicating the necessity of authentication, and wherein, when the screen is not a screen requiring authentication, the generation unit generates the information code that does not include the information indicating the necessity of authentication.

4. The image output apparatus according to claim 1, wherein, when authentication is necessary, the generation unit changes the function information of the image output apparatus to limit functions, and generates an information code including the address information, the changed function information, and the status information of the image output apparatus.

5. An image output method executable by an image output apparatus, the method comprising:

displaying a screen including an object indicating that printing is to be performed from a portable terminal apparatus;

generating, when the object included in the screen is selected, an information code indicating address information and function information of the image output apparatus or an information code indicating the address information and status information of the image output apparatus;

generating, when authentication is necessary, the information code that further includes information indicating a necessity of authentication and an address for authentication;

transmitting, in response to a request from the portable terminal apparatus having read the information code, to the portable terminal apparatus data for entering authentication information on the portable terminal apparatus;

receiving the authentication information entered on the portable terminal apparatus;

sending, when authentication is successfully completed as a result of authentication processing based on the received authentication information, authentication identification information and a result of successful authentication back to the portable terminal apparatus receiving a print job from the portable terminal apparatus having read the information code;

acquiring authentication identification information from the received print job; and outputting, when the acquired authentication identification information is one that has already been issued, the received print job, wherein the information code is displayed on the screen.

6. The image output method according to claim 5, further comprising deleting, when a reading completion notification for the information code is received from the portable terminal apparatus, the information code from the screen.

7. The image output method according to claim 5, further comprising:

generating, when the screen is a screen requiring authentication, the information code further including the information indicating the necessity of authentication; and generating, when the screen is not a screen requiring authentication, the information code that does not include the information indicating the necessity of authentication.

8. The image output method according to claim 5, further comprising changing, when authentication is necessary, the function information of the image output apparatus to limit functions, and generating an information code including the address information, the changed function information, and the status information of the image output apparatus.

9. A non-transitory computer-readable storage medium storing a program executable by an image output apparatus, the program comprising:

displaying a screen including an object indicating that printing is to be performed from a portable terminal apparatus;

generating, when the object included in the screen is selected, an information code indicating address information and function information of the image output apparatus or an information code indicating the address information and status information of the image output apparatus;

generating, when authentication is necessary, the information code that further includes information indicating a necessity of authentication and an address for authentication;

transmitting, in response to a request from the portable terminal apparatus having read the information code, to the portable terminal apparatus data for entering authentication information on the portable terminal apparatus;

receiving the authentication information entered on the portable terminal apparatus;

sending, when authentication is successfully completed as a result of authentication processing based on the received authentication information, authentication identification information and a result of successful authentication back to the portable terminal apparatus receiving a print job from the portable terminal apparatus having read the information code;

acquiring authentication identification information from the received print job; and outputting, when the acquired authentication identification information is one that has already been issued, the received print job, wherein the information code is displayed on the screen.

10. The non-transitory computer-readable storage medium according to claim 9, wherein the program further comprises deleting, when a reading completion notification for the information code is received from the portable terminal apparatus, the information code from the screen.

11. The non-transitory computer-readable storage medium according to claim 9, wherein the program further comprises generating, when the screen is a screen requiring authentication, the information code further including the information indicating the necessity of authentication; and generating, when the screen is not a screen requiring authentication, the information code that does not include the information indicating the necessity of authentication.

12. The non-transitory computer-readable storage medium according to claim 9, wherein the program further comprises changing, when authentication is necessary, the function information of the image output apparatus to limit functions, and generating an information code including the address information, the changed function information, and the status information of the image output apparatus.

* * * * *